United States Patent [19]

McClure

[11] 4,176,550

[45] Dec. 4, 1979

[54] DEPTH/FLOW MONITORING INSTRUMENTATION

[75] Inventor: Charles L. McClure, Malvern, Pa.

[73] Assignee: Pro-Tech, Inc., Paoli, Pa.

[21] Appl. No.: 875,225

[22] Filed: Feb. 6, 1978

[51] Int. Cl.² .......................................... G01F 23/14
[52] U.S. Cl. .................................... 73/302; 73/194 R
[58] Field of Search ..................... 73/302, 215, 194 R, 73/1 H, 3; 116/118 R

[56] References Cited

U.S. PATENT DOCUMENTS

| | | | |
|---|---|---|---|
| 3,475,959 | 11/1969 | Glassey | 73/302 X |
| 3,555,903 | 1/1971 | Glassey | 73/302 |
| 3,929,017 | 12/1975 | Kowalski | 73/215 X |
| 3,965,740 | 6/1976 | Martig, Jr. | 73/302 X |
| 4,034,607 | 7/1977 | Martig, Jr. | 73/302 X |
| 4,058,011 | 11/1977 | Martig, Jr. | 73/302 X |

Primary Examiner—Gerald Goldberg
Assistant Examiner—Joseph W. Roskos
Attorney, Agent, or Firm—Charles A. McClure

[57] ABSTRACT

A pressure-responsive instrument such as an indicator or recorder for use with a bubbler type of sensing probe for monitoring liquid depth or flow in a sewer pipe or the like. The instrument housing contains means for regulating the rate of bubble release to such probe and also contains means for diverting the bubble release temporarily to an adjacent bubble rate test location. The same housing also preferably carries a manifold for supporting bubble fluid containers and means for regulating the resulting bubble fluid pressure in the manifold, for connection to such probe.

8 Claims, 4 Drawing Figures

DEPTH/FLOW MONITORING INSTRUMENTATION

This invention relates to liquid depth/flow monitoring instrumentation, especially a pressure-responsive instrument for use with a bubbler type of sensing probe.

Pressure-responsive recorders of liquid depth or flow are commonly used with bubbler types of sensing probes for use in sewer pipes or the like, as disclosed in Martig U.S. Pat. Nos. 3,965,740 and 4,034,607, for example. Such recorders conventionally comprise means for supporting a chart and for advancing it as a function of time, a pen supported to sweep over the chart as a function of sensed pressure, a pressure-responsive element (e.g., bellows, bourdon tube, or diaphragm), linkage interconnecting the pressure-responsive element to the pen, and a housing enclosing and supporting the foregoing elements. Added external equipment for providing a source of gaseous fluid for bubbling and means for regulating its pressure and bubble rate have been customary. Space and weight considerations often render such external equipment ill-advised or preclude it entirely.

A primary object of the present invention is monitoring of liquid depth or flow by the bubbler method without necessity for indicating or recording instrumentation, on the one hand, and separate bubble source and regulation, on the other hand, separate and apart from one another.

Another object is provision of bubble rate regulating and testing means within the housing of a depth/flow indicating or recording instrument.

A further object is supporting of one or more bubble source containers on such an instrument housing.

Other objects of this invention will be apparent from the following description and the accompanying diagrams of a preferred embodiment presented by way of example rather than limitation.

In general, the objects of the present invention are accomplished, in a pressure-responsive recorder for use with a bubbler type of sensing probe for monitoring depth or flow of liquid in a sewer or water pipe or conduit by means for reducing the pressure of bubble fluid from a super-atmospheric pressure to a fractional atmospheric gauge pressure, means for regulating rate of bubble fluid release to such probe, and means for diverting the bubble fluid release temporarily to a bubble rate test position at the instrument, preferably including bubble sight means located to receive the temporarily diverted bubble fluid and means for supporting bubble fluid containers and on/off valve means therefor, especially wherein the supporting means includes a manifold to receive bubble fluid from a plurality of bubble fluid containers so supported and carries the means for reducing the bubble fluid pressure.

A suitable sensing probe for use with such instrumentation is disclosed in Martig U.S. Pat. Nos. 3,965,740 and 4,034,607, and another one is disclosed in my patent application, Ser. No. 863,862 filed Dec. 23, 1977. Other more conventional bubble tubes may be used instead. Accordingly, no further disclosure of sensing probes is necessary or desirable in the present application.

Figure 1:
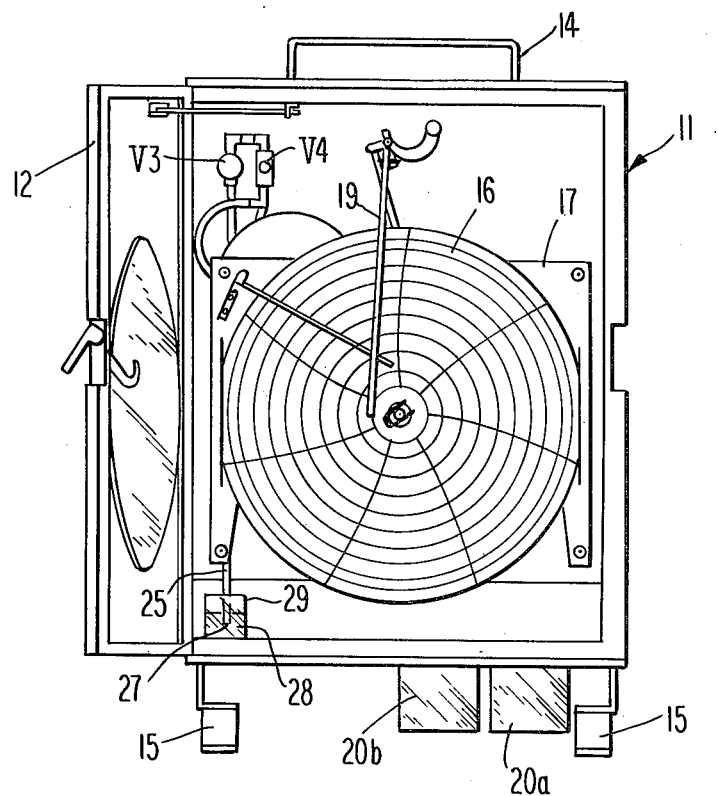
FIG. 1 is a front elevation of a recorder housing according to this invention.

FIG. 1 shows instrument housing 11 provided with front door 12 (shown open) and with handle 14 on top and feet 15 on each side at the bottom. Visible in part below the front or skirt portion of the housing are two containers 20a and 20b of bubble fluid. Visible inside the housing are circular chart 16, chart plate 17, pen arm 19, and the lifter arm which is movable to space the pen out of contact with the chart. At the upper left are bubble rate control valve V3 and test button V4. At the lower left is bubble dip tube 25, which leads from the test button and terminates in bubble outlet 27 in sight glass 29, which normally contains liquid 28.

Figure 3:
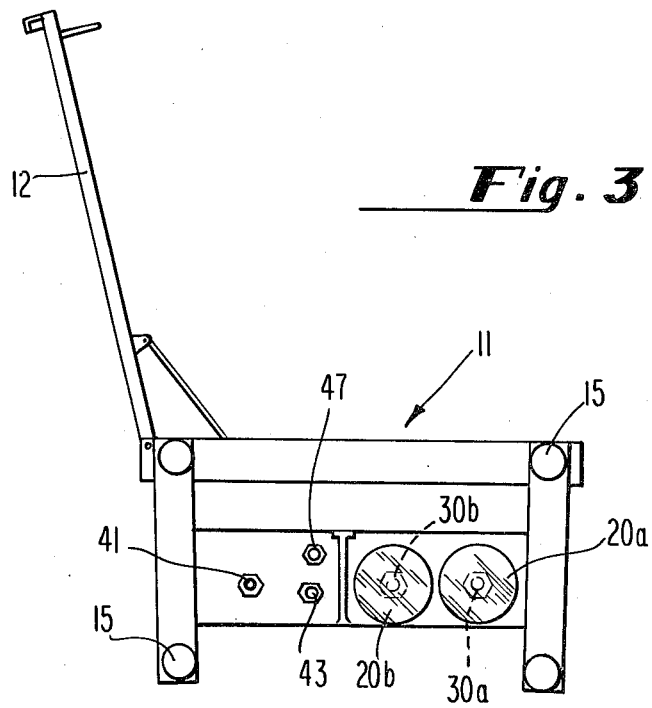
FIG. 3 is a bottom plan of the same instrument.
Figure 2:
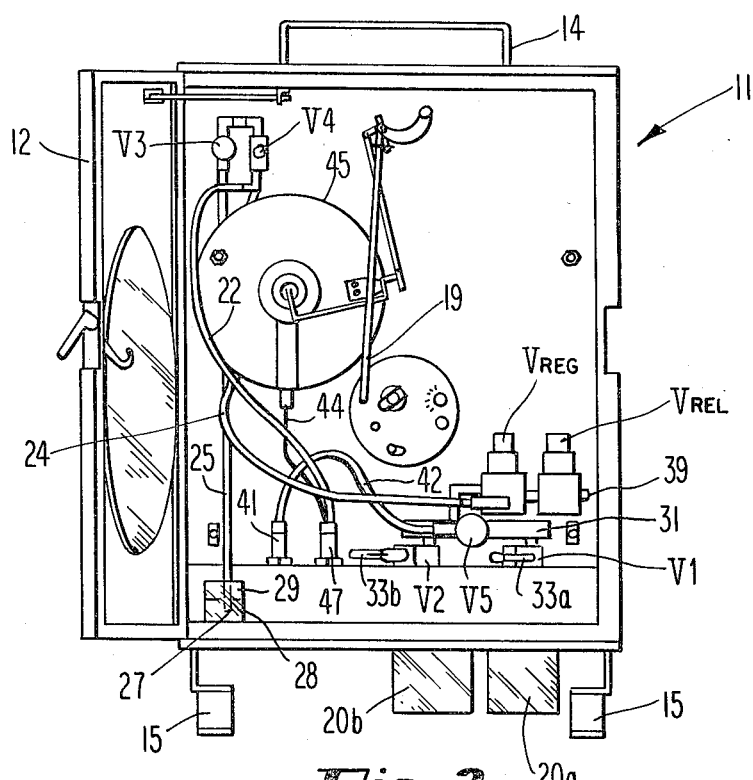
FIG. 2 is a front elevation of the same instrument with the chart and chart plate removed.

FIG. 2 is similar to FIG. 1 except that elements covered by the chart in FIG. 1 are visible in the absence of the chart and the chart plate, removed to show the interior. Manifold 31 at the lower right has pair of on/off valves V1 and V2 with cam type handles 33a and 33b shown in closed and open positions, respectively. Containers 20a and 20b are threaded into the respective valve bodies. Mounted on the manifold and connected thereto are step-down pressure regulator $V_{REG}$ and pressure relief valve $V_{REL}$. External pressure valve V5 on the manifold has a knob to be rotated to closed position when such bubble source is being used and rotated open when an optional external bubble source (not shown) is connected for use via fitting 41 at the lower left, which is connected to the manifold by line 42. See also the bottom view in FIG. 3.

Also at the lower left are static pressure fitting 43, which is connected to sensing element 45 by the line 44, and bubble line fitting 47, which is connected to bubble test button V4 by line 22. Line 24 interconnects the manifold and that valve V3 via pressure regulator $V_{REG}$.

Figure 4:
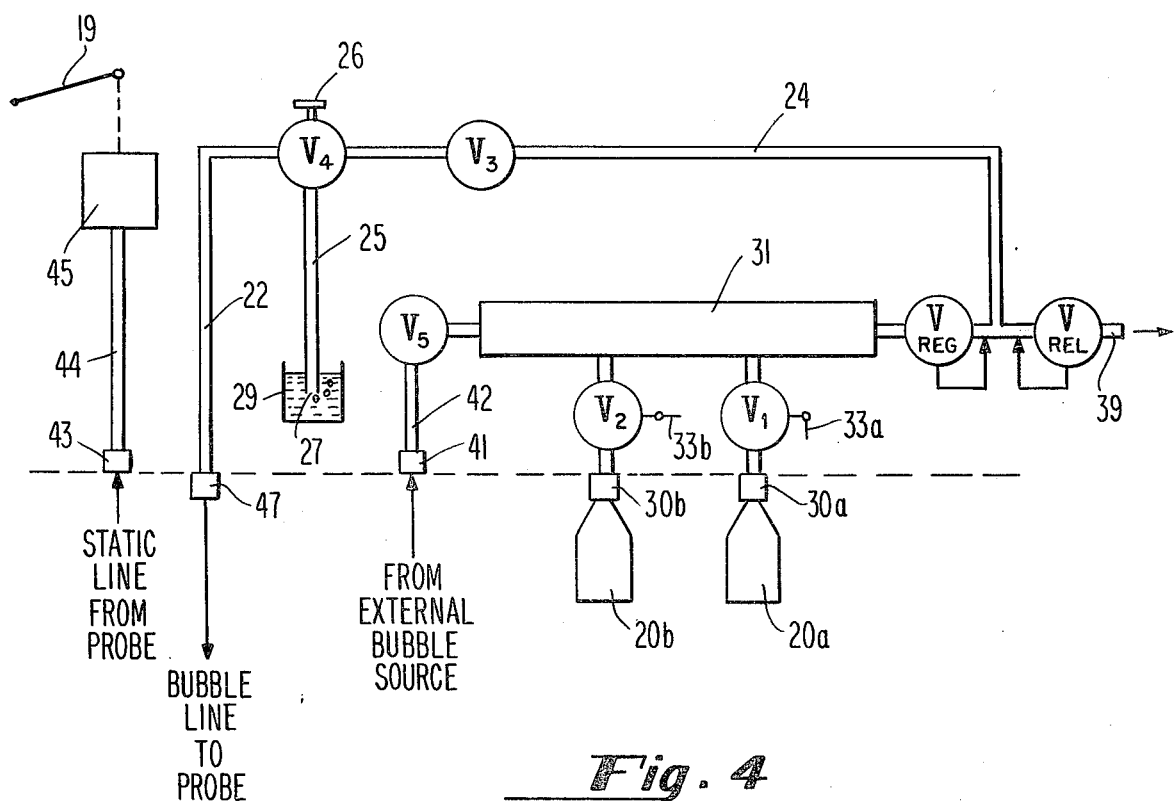
FIG. 4 is a schematic piping diagram for the bubble fluid in or with such instrument.

FIG. 4 shows the piping of the foregoing pneumatic elements schematically, from which their operation is apparent. Unless an external bubble source, such as a large nitrogen cylinder or a plant air supply (for example) is used, in which event valve V5 should be opened by appropriate rotation of the valve knob, the so-called internal bubble source provided by refrigerant cans 20a and 20b screwed into piercing fittings 30a and 30b will be most convenient. With external valve V5 rotated closed, opening of valve V2 for can 20b by extending cam lever arm 33b releases bubble fluid (usually gaseous) into manifold 31 at super-atmospheric pressure, usually on the order of 5 to 10 atmospheres gauge. Pressure-regulating valve $V_{REG}$ at the outlet from the manifold reduces the pressure into line 24 to a fractional atmospheric gauge pressure. Relief valve $V_{REL}$ is connected at the entrance end of line 24 to vent the line to the surrounding atmosphere through vent outlet 39 at about a half-atmosphere of gauge pressure to protect downstream components in the event of failure of the pressure regulator. Line 24 conducts the bubble fluid to bubble rate regulator valve V3, which is manually adjustable, and then to test valve V4, which normally is open downstream but upon depression of test button 26 thereof diverts the bubble fluid into dip tube 25, which terminates in open outlet end 27 below the surface of liquid in sight glass 29. With the test button depressed, bubbles emerge from the submerged outlet at a rate that is controlled by manual adjustment of valve V5, usually to a rate of about a bubble per second. Releasing of the test button connects line 24 to downstream line 22, which leads to fitting 47, to which an external bubble-emitting sensing probe (not shown in FIG. 4) is connected as mentioned above and described in the identified disclosure documents. The pressure with which liquid overlying the probe's bubble outlet resists release of bubbles therefrom is transmitted to pressure-sensing elements 45 via an external static pressure line (not shown) connected to fitting 43 and by connecting line 44. Indicating or pen arm 19, whose position is determined by expansion, etc. of the pressure-sensing element, indicates and/or records the static pressure in terms of depth of the liquid overlying the sensing probe bubble outlet or in terms of flow of such liquid if a known relationship between depth and flow is available, whether empirical or theoretical.

Thus, this invention provides an instrument for use in liquid depth/flow measurement by the bubbler method with integral provision for bubble source, bubble rate regulation and bubble test, while permitting optional use of a remote external source of bubble fluid. Although a preferred embodiment has been described and illustrated, modifications may be made therein, as by adding, combining, or subdividing parts or steps, or substituting equivalents, while retaining advantages and benefits of the invention itself, which is defined in the following claims.

The claimed invention is:

1. Pressure-responsive recorder for use with a bubbler type of sensing probe for monitoring depth or flow of liquid in a sewer or water pipe or conduit, comprising a housing, pressure-responsive means therein, means thereon for supporting a bubble fluid container, means therein for receiving bubble fluid from such container, means therein for regulating the rate of release of bubble fluid from such container means for connecting released bubble fluid to a connecting line to such probe, and means thereon for connecting a static pressure line from such probe to the pressure-responsive means thereon.

2. Recorder according to claim 1, including means therein for diverting bubble fluid from the bubble fluid pressure connecting means to means thereon for testing the bubble release rate.

3. Recorder according to claim 2, wherein the testing means includes bubble sight means and means for diverting released bubble fluid to the sight means temporarily to test the bubble release rate.

4. Recorder according to claim 2, including means for reducing the pressure of the bubble fluid between such containers and release thereby to the testing means or to the probe.

5. In a pressure-responsive recorder for use with a bubbler type of sensing probe for minitoring depth or flow of liquid in a sewer or water pipe or conduit, the combination of means for reducing the pressure of bubble fluid from a super-atmospheric pressure to a fractional atmospheric pressure, means for regulating rate of bubble fluid release to such probe, means for diverting the bubble fluid release temporarily to a bubble rate test position at the recorder; including means for supporting bubble fluid containers and on/off valve means therefor, wherein the supporting means includes a manifold to receive bubble fluid from a plurality of bubble fluid containers so supported and wherein the manifold carries the means for reducing the bubble fluid pressure and means for piercing sealed containers of bubble fluid to release bubble fluid therefrom into the manifold in open or "on" valve position and for resealing such containers so supported to preclude release of bubble fluid therefrom in closed or "off" valve position.

6. Recorder according to claim 5, including, among the means carried by the housing adjustable means for regulating the rate of bubble fluid release.

7. Recorder according to claim 5, including among the means carried by the recorder bubble sight means and means for diverting the released bubble fluid temporarily to the bubble sight means.

8. Recorder according to claim 5, wherein the bubble sight means comprises an open-ended tube leading from the bubble rate regulating means and a container into which the end of the tube dips.

* * * * *